2,788,837

PROCESS FOR PREPARING SYNTHETIC MICA PRODUCTS

Francis A. Barr, Merrick, N. Y., assignor to Sylvania Electric Products Inc., a corporation of Massachusetts No Drawing. Application April 26, 1956, Serial No. 580,710

6 Claims. (Cl. 154—2.6)

My invention is directed toward synthetic mica structures and methods for making the same.

The term "mica" or "the mica" defines a group of hydrated alumino silicate minerals which have a high dielectric strength and which possess a characteristic analogous crystallographic sheet-like structure. This structure is flexible and transparent and has a high degree of cleavability (i. e. the sheet-like structure can be divided and subdivided into extremely thin sheets).

Physically, mica is composed of sheets or layers of aluminum hydroxide and/or magnesium hydroxide sandwiched between two silica layers, this sequence of layers being repeated indefinitely to form mica sheet.

Mica is extensively used by the electrical industry, for example, as a dielectric material for capacitors, as electrode supports in electron tubes, and the like. However, it has certain inherent disadvantages. For example, at temperatures on the order of 800° C. and higher, mica becomes dehydrated and disintegrates. Further, mica, being a mineral, can take various forms, such as muscovite (potassium mica), phlogopite (magnesium mica) and biotite (magnesium-iron mica). Therefore, its properties are not uniform; for example, its dielectric constant attains a range of values rather than having one established value.

Attempts have been made to overcome these disadvantages by producing mica synthetically to provide a sheet-like structure differing from the natural mica in that the hydroxyl ions contained in the hydroxide layers of natural mica are replaced by fluorine ions.

Such synthetic (fluorine) mica has been produced in the form of chunks containing microscopically sized mica crystals. These chunks are then broken down into minute flakes, for example, by grinding in aqueous media; these flakes are then permitted to settle out of such media onto a suitable surface (as for example a moving belt) in the form of a reconstituted mica sheet or mat; the sheet is dried; and finally a number of such sheets are stacked in a die and hot pressed to produce what is known to the art as a recrystallized hot pressed sheet of reconstituted synthetic mica.

Sheets of this type will not become dehydrated at elevated temperatures. Moreover, the properties of these sheets are more nearly uniform than natural mica.

As compared to natural mica, however, this synthetic mica product is mechanically weak and further has unsatisfactory electrical properties. For example, the modulus of rupture for natural mica averages about 55,000 pounds per square inch; that of the synthetic product ranges between 8–15,000 p. s. i. The modulus of shear for natural mica ranges between 1000–2000 pounds per inch as contrasted to 93–185 pounds per inch for the synthetic product. Moreover, the dielectric strength of natural mica (2000–6000 volts per mil) is much larger than that of the synthetic product (300–450 volts per mil).

In my copending application Serial No. 544,576 filed October 7, 1955, I disclosed a new process in which synthetic mica sheet produced in a manner well known to the art is treated with at least one mineralizer selected from the class of inorganic fluorine compounds which while in contact with the mica sheet and heated, yield silicon tetrafluoride as a vapor phase. The treated sheet is hot pressed. The resultant structure as compared to the known synthetic mica product exhibits sharply increased mechanical and dielectric strength.

As disclosed in more detail in the above-identified application, synthetic mica products produced in accordance with the above process are structurally different from the known synthetic mica products and possess improved mechanical and electric properties. To differentiate between these two types of products, I define the synthetic mica products produced in accordance with this process as mineralized recrystallized hot pressed sheets of reconstituted synthetic mica.

Even though the mineralized synthetic mica product is markedly superior to the non-mineralized product, both types of synthetic mica products exhibit mechanical and dielectric properties which are markedly inferior to the mechanical and dielectric properties of natural mica. For example, natural mica has a dielectric strength which ranges between 2000–6000 volts per mil as compared to 600–630 volts per mil for the mineralized synthetic product and 300–450 volts per mil for the non-mineralized synthetic product. Further, natural mica has a modulus of rupture which is on the order of 55,000 pounds per square inch as compared to 20,000 pounds per square inch for the mineralized product and less than 15,000 pounds per square inch for the non-mineralized product.

It is an object of the present invention to increase the mechanical and dielectric properties of mineralized and non-mineralized synthetic mica products.

Another object is to provide mineralized and non-mineralized synthetic mica products characterized by sharply increased mechanical and dielectric strength and further to provide processes for producing the same.

Still another object is to increase the mechanical and dielectric strength of mineralized and non-mineralized synthetic mica products by promoting the edge growth of the individual crystals contained within the mica sheet.

These and other objects of my invention will either be explained or will become apparent hereinafter.

Recrystallized hot pressed sheets of reconstituted synthetic mica when examined under a microscope will be found to contain numerous minute pores or voids. These pores or voids are also found to a lesser degree in the mineralized product. Stated differently, both mineralized and non-mineralized synthetic mica products are porous, although the degree of porosity of the non-mineralized product is accentuated as compared to the mineralized product.

For example, the porosity of mineralized synthetic product can range between 75%–90% of the theoretical density (the density at which no pores or voids exist).

It is my belief that these voids are formed during the mat forming process and further that the edge growth of the individual crystals forming the mica sheet during hot pressing is insufficient to destroy such voids. Further, it is my belief that the relatively poor mechanical strength of the synthetic products (as compared to that of natural mica) results from the presence of these voids.

Accordingly, in this invention, the edge growth is promoted by subjecting the synthetic mica mat to a lateral or shearing force (which is parallel to the surfaces of the mat) during or after a hot rolling or pressing operation. In this manner, the voids are either eliminated or at least substantially reduced in number, and a synthetic mica product having a density which approaches the theoretical density is produced.

The dielectric strength of a mineralized synthetic mica product having the increased density approaches that of natural mica. For example, the actual dielectric strength can fall within the range 1000–2000 volts per mil. Further, I have found that this product also has markedly improved mechanical properties. For example, the modulus of rupture of mineralized synthetic mica representing sheets produced in this manner can range between 25,000–50,000 pounds per square inch.

Thus, a mineralized synthetic mica product produced in this manner exhibits mechanical and dielectric properties which are comparable to that of natural mica.

In one method in accordance with this invention, the shearing force is applied as synthetic mica mat or sheet is fed through a hot rolling mill. In another method, the mat is first hot pressed to maximum obtainable density and then the hot pressed mat is subjected to shearing force in a subsequent hot rolling process. In either method, the effect of lateral movement of the material during compaction is to sharply increase the actual density of the resultant synthetic product.

My invention will now be described in detail in the examples which follow.

*Example I*

Mineralized synthetic mica sheet 8 inches in width, 24 inches long, and .005 inch thick, prepared in the manner set forth in the above identified copending application, was heated in an argon atmosphere to a temperature of 1325° C. for a period of 20–30 minutes. The heated sheet was then transferred in an argon containing atmosphere to a hot rolling mill. The mill itself was operated in the same argon atmosphere.

The mill contained two tungsten rollers, 8 inches wide and 5 inches in diameter. The contact pressure between the rollers was adjusted to a value between 100,000 and 500,000 pounds separating force and the rollers were heated to a temperature of about 1300° C. The heated sheet was successively passed between the rollers until a 40% reduction in thickness was obtained, the ultimate thickness of the sheet being .002 inch.

It was found that the density of this hot rolled sheet approached 95% of the theoretical density. Subsequent tests revealed that the dielectric strength of this sheet was approximately 1800 volts per mil and the modulus of rupture was approximately 30,000 per square inch.

This process was repeated using various firing temperatures falling within the range 1100° C.–1340° C. It was found that similar results were obtained, the dielectric strength falling within the range 1000–2000 volts per mil, and the modulus of rupture falling within the range 25,000–50,000 pounds per square inch. Both the dielectric strength and the modulus of rupture were found to increase as the firing temperature was increased.

*Example II*

Conventional synthetic mica sheet was hot pressed in an argon containing atmosphere at a pressure of 3500 pounds per square inch and at a temperature of 1300° C. for a period of 20 minutes. This hot pressed sheet was then hot rolled in the same manner as in Example I.

The dielectric strength of this rolled sheet was found to be approximately 600 volts per mil and its modulus of rupture was approximately 17,000 pounds per square inch.

*Example III*

Example II was repeated using mineralized synthetic mica sheet, the pressures used during hot pressing ranging between 1275–3500 pounds per square inch and hot pressing temperatures ranging from 1100° C. to 1340° C.

The hot pressed sheet was then hot rolled in the manner outlined in Example I. A 30% reduction in thickness resulted from the hot pressing operation and an additional 10% reduction was obtained during hot rolling.

The dielectric strength of the hot rolled sheet and its modulus of rupture were found to be as indicated in Example I.

I have found that the process described above must be conducted in an oxygen free atmosphere both to prevent the fluorine ions emitted during heating of the mica from escaping and to prevent oxidation of the mica. While argon was used as a matter of convenience, other inert or reducing atmospheres can also be used.

While I have shown and pointed out my invention as applied above, it will be apparent to those skilled in the art that many modifications can be made within the scope and sphere of my invention as defined in the claims which follow.

What is claimed is:

1. A method for densifying a mineralized recrystallized hot pressed sheet of reconstituted synthetic mica comprising the steps of preheating said sheet in an oxygen free atmosphere to a temperature falling within the range 1100°–1340° C.; and hot rolling said preheated sheet in an oxygen free atmosphere and at a temperature falling within said range while subjecting said preheated sheet to a very high shearing force to densify said sheet.

2. A method for densifying a mineralized recrystallized hot pressed sheet of reconstituted synthetic mica comprising the steps of preheating said sheet in an oxygen free atmosphere to a temperature falling within the range 1100°–1340° C.; and hot rolling said preheated sheet in an oxygen free atmosphere and at a temperature falling within said range while subjecting said preheated sheet to a shearing force on the order of 100,000–500,000 pounds.

3. A method as set forth in claim 2, wherein said atmosphere is an inert atmosphere.

4. A method as set forth in claim 3, wherein said atmosphere is argon.

5. A method for densifying a sheet of synthetic mica which comprises the steps of hot pressing said sheet in an oxygen free atmosphere at a temperature falling within the range 1100°–1340° C. and at a pressure falling within the range 1275–3500 pounds per square inch; hot rolling said pressed sheets in an oxygen free atmosphere and at a temperature falling within said range while subjecting said hot pressed sheet to a very high shearing force to densify said sheet.

6. A method as set forth in claim 5, wherein said shearing force is on the order of 100,000–500,000 pounds.

References Cited in the file of this patent

UNITED STATES PATENTS

| | | |
|---|---|---|
| 2,363,323 | Hill | Nov. 21, 1944 |
| 2,704,261 | Comefero | Mar. 15, 1955 |

OTHER REFERENCES

The Synthetic Mica Program-2, Office of Naval Research, April 1, 1950, pages 20–24.